US011046842B2

(12) United States Patent
Duarte et al.

(10) Patent No.: US 11,046,842 B2
(45) Date of Patent: Jun. 29, 2021

(54) METHOD FOR PREPARING PANELS MADE OF A COMPOSITE OF CORK AND POLYETHYLENE

(71) Applicant: Amorim Compcork, LDA., Mozelos (PT)

(72) Inventors: Carlos Alberto Fernandes Duarte, Palhais BRR (PT); Susana Pinto Araujo Silva Estima Martins, Oporto (PT); Marta Gilbert Reinas, Oporto (PT)

(73) Assignee: Amorim Cork Composites, S.A., Mozelos (PT)

( * ) Notice: Subject to any disclaimer, the term of this patent is extended or adjusted under 35 U.S.C. 154(b) by 286 days.

(21) Appl. No.: 16/086,770

(22) PCT Filed: Jan. 12, 2017

(86) PCT No.: PCT/PT2017/050001
§ 371 (c)(1),
(2) Date: Sep. 20, 2018

(87) PCT Pub. No.: WO2017/164757
PCT Pub. Date: Sep. 28, 2017

(65) Prior Publication Data
US 2019/0092933 A1  Mar. 28, 2019

(30) Foreign Application Priority Data

Mar. 22, 2016  (PT) ........................... 109256

(51) Int. Cl.
| | |
|---|---|
| *B29C 43/52* | (2006.01) |
| *B29C 43/48* | (2006.01) |
| *B29C 43/00* | (2006.01) |
| *B29C 43/58* | (2006.01) |
| *C08L 23/06* | (2006.01) |
| *C08L 23/04* | (2006.01) |
| *C08L 97/00* | (2006.01) |
| *B29K 511/02* | (2006.01) |

(52) U.S. Cl.
CPC ............ *C08L 23/06* (2013.01); *B29C 43/003* (2013.01); *B29C 43/48* (2013.01); *B29C 43/52* (2013.01); *C08L 23/04* (2013.01); *C08L 97/007* (2013.01); *B29C 2043/483* (2013.01); *B29C 2043/5808* (2013.01); *B29C 2043/5816* (2013.01); *B29C 2043/5825* (2013.01); *B29K 2023/06* (2013.01); *B29K 2511/02* (2013.01); *C08L 2205/03* (2013.01)

(58) Field of Classification Search
CPC ........ C08L 23/06; C08L 23/04; C08L 97/007; C08L 2205/03; C08L 97/00; B29C 43/003; B29C 43/48; B29C 2043/483; B29C 43/52; B29C 2043/5808; B29C 2043/5816; B29C 2043/5825; B29K 2023/06; B29K 2511/02; B29K 2311/02; B29K 2711/02; B29K 2911/02; E04C 2/00

See application file for complete search history.

(56) References Cited

U.S. PATENT DOCUMENTS

| | | | | |
|---|---|---|---|---|
| 8,283,394 | B2* | 10/2012 | Pfaadt ................... | C08L 97/007 524/13 |
| 9,156,233 | B2* | 10/2015 | Dossche .................. | E04C 2/12 |
| 10,118,311 | B2* | 11/2018 | Thiers ...................... | B27N 3/00 |
| 10,479,134 | B2* | 11/2019 | Hannig ................. | E04F 15/102 |
| 2010/0311854 | A1* | 12/2010 | Thiers ..................... | E04F 15/02 521/84.1 |
| 2014/0109507 | A1* | 4/2014 | Dossche .................. | B32B 5/18 52/588.1 |
| 2016/0369101 | A1* | 12/2016 | De Freitas Barros Diniz Santos ..................... | B63B 5/24 |

FOREIGN PATENT DOCUMENTS

| | | | |
|---|---|---|---|
| DE | 19918314 | A1 | 11/1999 |
| PT | 103898 | B | 4/2010 |
| WO | WO2009072914 | * | 6/2009 |
| WO | WO2011014085 | * | 2/2011 |
| WO | 2015104671 | A1 | 7/2015 |

* cited by examiner

Primary Examiner — Jeffrey M Wollschlager
(74) Attorney, Agent, or Firm — The Watson IP Group, PLC; Jovan N. Jovanovic

(57) ABSTRACT

The present invention relates to a process for preparation of polyethylene-cork composite panels comprising the steps of: mixing 10-64% of cork granulate and 36-90% of polyethylene granulate at room temperature, and feeding a press with this mixture; compressing this mixture in the press with a compression force in the range of 300-450 kN, at a temperature in the range of 160-200° C. and for a hot compression time between 24-180 seconds; and cooling to room temperature, with a compression force between 350-450 kN, for a cold compression time between 32 and 240 seconds; to obtain panels with a thickness between 3 and 5 mm. The invention further relates to a polyethylene-cork composite panel and also to use thereof in the construction industry, particularly as cover board core.

13 Claims, No Drawings

METHOD FOR PREPARING PANELS MADE OF A COMPOSITE OF CORK AND POLYETHYLENE

FIELD OF THE INVENTION

The present invention relates to a process for preparation of polyethylene-cork composite panels from cork granulate and polyethylene granulate, for application in the construction industry, particularly as cover board core (for example, floor, wall or ceiling panels).

BACKGROUND OF THE INVENTION

The use of cork materials associated with thermoplastics in a variety of industrial applications and, more particularly, in cover board materials is well known.

These materials provide high levels of comfort to users, and the combination between them and with other materials adds higher versatility to these products, namely, in esthetical aspects and others like for example resistance to load and wear.

The natural properties of cork material have been extensively exploited in the production of coverings with exceptional properties in terms of damping of footstep impact, as well as acoustical and thermal insulation, among others.

Luxury vinyl floorings are known and also referred to in the art as LVT (Luxury Vinyl Tile), which usually have a thickness of 2 to 5 mm, available as PVC-based laminated panels and which can be easily connected using a locking system. The core layer guarantees flatness of the floor and insulation to impact noise. To this end, the PVC material is formulated with the addition of up to 60 to 70% of mineral fillers to obtain a thick laminate of high weight and density.

The PVC core is produced in two double-screw extruders and two rolling calanders. The first extruder, used to plasticize and homogenize the PVC compound, is equipped with a side feeder to incorporate a significant portion of mineral fillers and additional additives. The material leaving the extruder is applied to one side of a fiberglass mat in the first rolling calender. The obtained composite is then guided through the second rolling calender to apply a second PVC compound, previously processed in the second extruder, to the other side of the fiberglass mat. This method provides the processing, composition and production of the series tile.

LVT floorings may have some problems related to the release of volatile compounds due to the presence of plasticizers in their formulation. In some cases, the content of volatile compounds exceeds the minimum acceptable limits according to national standards of ambient air quality in domestic or commercial use.

Moreover, PVC changes its behaviour when subjected to high temperatures and acquires gelling properties, making it difficult to melt and consequently its binding to other components in a mixture.

PT 103898 B relates to a process for the production of cork polymer composite granules. In this process, the raw materials are functionalized, i.e., a chemical reaction occurs which changes the raw materials to promote their homogenization and these are then subjected to one of the pultrusion or extrusion techniques. These techniques involve very high shear stress that damages the raw materials and are therefore not recommended when it is intended to maintain their integrity until the end of the process. In the examples of said patent, processes for the production of cork and polymer composite panels using granules obtained by the claimed process, in which the granules were prepared containing both cork and polyethylene, are also shown.

The processes described above are thus complex, expensive and time consuming, and the resulting products do not have advantageous physicochemical and mechanical properties.

Accordingly, there is a need in the art for a process for preparation of cork and polymer composite panels which obviate the economic and technical disadvantages identified above, namely allowing mixing of cork granulate and polymer granulate, without the need to previously preparing a mixed granulate containing both cork and polymer. Such a process should allow the mixing of granulates without stratification of cork and polymer granulates and consequently allowing the production of composite panels with a homogeneous distribution of their components and excellent physicochemical and mechanical properties, namely maintaining the added value of cork density.

SUMMARY OF THE INVENTION

The present invention provides a process for preparation of polyethylene-cork composite panels comprising the steps of:
a) mixing 10-64% of cork granulate and 36-90% of polyethylene granulate at room temperature, and feeding a press with this mixture;
b) compressing the mixture of step a) in the press with a compression force in the range of 300-450 kN, at a temperature in the range of 160-200° C. and for a hot compression time between 24-180 seconds;
c) cooling to room temperature, with a compression force between 350-450 kN, for a cold compression time between 32 and 240 seconds;
to obtain panels with a thickness between 3 and 5 mm, provided that:
for a thickness of 3 mm and temperature of step b) of 160° C., the minimum value of the hot compression time is 180 seconds; and
for a thickness of 3 mm when the mixture has 60% or more of cork, the temperature value of step b) is 200° C.

In an embodiment of the invention, in step a) up to 20% of paraffin is further added.

In another embodiment of the invention, in step a) a further 10 to 34% of a filler selected from the group comprising calcium carbonate, talc, magnesium hydroxide, kaolin, natural and synthetic fibres, among others, and mixtures thereof, are also added. Preferably, the filler is calcium carbonate.

In yet another embodiment of the invention, the polyethylene granulate of step a) comprises 20 to 32% of a filler selected from the group comprising calcium carbonate, talc, magnesium hydroxide, kaolin, natural and synthetic fibres, among others, and mixtures thereof. Preferably, the filler is calcium carbonate.

In one aspect of the invention, the mixing is carried out with cork granulate having a particle size in the range of 0.5-1 mm.

In yet another aspect of the invention, the mixing is carried out with polyethylene granulate having a particle size in the range of 0.3-1 mm.

In a preferred embodiment of the invention, the process for preparation of polyethylene-cork composite panels comprises the steps of:

a) mixing 37% of cork granulate and 63% of polyethylene granulate at room temperature, and feeding a press with this mixture;
b) compressing the mixture of step a) in the press with a compression force in the range of 300-450 kN, at a temperature of 180° C. and for a hot compression time of 72 seconds;
c) cooling to room temperature, with a compression force between 350-450 kN, for a cold compression time of 96 seconds;
to obtain a panel with a thickness of 5 mm.

In another preferred embodiment of the invention, the process for preparation of polyethylene-cork composite panels comprises the steps of:
a) mixing 50% of cork granulate, 46% of polyethylene granulate and 4% of paraffin at room temperature, and feeding a press with this mixture;
b) compressing the mixture of step a) in the press with a compression force in the range of 300-450 kN, at a temperature of 160° C. and for a hot compression time of 180 seconds;
c) cooling to room temperature, with a compression force between 350-450 kN, for a cold compression time of 240 seconds;
to obtain a panel with a thickness of 3 mm.

In yet another preferred embodiment of the invention, the process for preparation of polyethylene-cork composite panels comprises the steps of:
a) mixing 31.5% of cork granulate, 54.9% of polyethylene granulate, 3.6% of paraffin and 10% of calcium carbonate at room temperature, and feeding a press with this mixture;
b) compressing the mixture of step a) in the press with a compression force in the range of 300-450 kN, at a temperature of 190° C. and for a hot compression time of 90 seconds;
c) cooling to room temperature, with a compression force between 350-450 kN, for a cold compression time of 120 seconds;
to obtain a panel with a thickness of 5 mm.

In another preferred embodiment of the invention, the process for preparation of polyethylene-cork composite panels comprises the steps of:
a) mixing 25% of cork granulate and 43% of granulated polyethylene with 32% of incorporated calcium carbonate at room temperature, and feeding a press with this mixture;
b) compressing the mixture of step a) in the press with a compression force in the range of 300-450 kN, at a temperature of 190° C. and for a hot compression time of 120 seconds;
c) cooling to room temperature, with a compression force between 350-450 kN, for a cold compression time of 160 seconds;
to obtain a panel with a thickness of 5 mm.

The present invention further provides a polyethylene-cork composite panel having a density between 800-900 kg/m$^3$, tensile strength (EN 319) higher than 1.3 MPa, water absorption of less than 3% and hardness between 45 and 65 Shore D.

This panel can be obtained by the process disclosed in the present invention.

The present invention further provides the use of the polyethylene-cork composite panel having a density between 800-900 kg/m$^3$, flat tensile strength (EN 319) higher than 1.3 MPa, water absorption of less than 3% and hardness between 45 and 65 Shore D, as cover board core.

DETAILED DESCRIPTION OF THE INVENTION

The present invention relates to a process for preparation of polyethylene-cork composite panels.

In the context of the present description, the term "comprising" should be understood as "including, among others". As such, said term should not be interpreted as "consisting only of".

By "cork granulate" is meant, in the context of the present description, cork fragments whose particle size is comprised between 0.2 to 1 mm, preferably between 0.5 to 1 mm, with a moisture content between 0 and 10% and a density between 200 and 320 kg/m$^3$.

In the context of the present invention, "polyethylene granulate" means micronized polyethylene, with or without fillers, whose particle size is comprised between 0.3 and 1 mm, with a moisture content between 0 and 5% and a intrinsic density between 930 and 1100 kg/m$^3$. Preferably, the polyethylene may be recycled polyethylene.

Still within the context of the present invention, by room temperature is meant a temperature in the range between 10° C. and 40° C.

In the present invention, "press" means a mechanical device which compresses a material by applying a force that compresses the granulate mixture to a predefined target thickness. Those skilled in the art, on the basis of the teachings of the present invention, will know to use any press, either continuous or discontinuous, for example a (Double Belt Press) DBP-like continuous plate press. For example, a speed of 2 m/min and a hot mat zone of 6 meters correspond to a compression time of 180 seconds.

In the present invention, by "hot compression time" is meant the time that the mixture of cork granulate and polyethylene granulate remains in the press at a temperature in the range between 160° C. and 200° C.

In the present invention, by "cold compression time" is meant the time that the mixture of cork granulate and polyethylene granulate remains in the press until it reaches room temperature.

Unless expressly stated otherwise, the percentages mentioned in the present description and claims refer to percentages by mass.

It should be noted that any X value in the present description must be interpreted as an approximate value of the actual X value, as such approximation to the actual value would reasonably be expected by the person skilled in the art due to experimental and/or measurement conditions which introduce deviations from the real value.

Unless otherwise noted, the ranges of values given in the present description are intended to provide a simplified and technically accepted way to indicate each individual value within the respective range. By way of example, the expression "1 to 2" or "between 1 and 2" means any value within this range, for example 1.0; 1.1; 1.2; 1.3; 1.4; 1.5; 1.6; 1.7; 1.8; 1.9; 2.0. All values mentioned in the present description must be interpreted as approximate values, for example the reference to "160° C." means "about 160° C.".

The process of the present invention provides a particularly suitable mode for the production of cork and polymer composite panels, overcoming the problems identified in the prior art with respect to cover board cores and simultaneously enabling the use of cork granulate and polymer granulate without the need to previously preparing a mixed granulate of cork and polymer.

Polyethylene is a simple and easily obtainable polymer. However, its melting point is close to 135° C. and therefore it is difficult to handle due to melting when working at temperatures comprised in a range between 160° C. and 200° C., resulting in a excessive fluidity that does not allow panels with the desired properties. For this reason, the use of PVC has been preferred over the use of polyethylene.

Moreover, the difference in particle sizes between the cork and polyethylene individual granulate also creates homogeneity problems in a mixture of these, as the raw materials are stratified when exposed to temperatures in the above mentioned range and therefore the production of panels from individual granulates is impracticable.

Surprisingly, it has been found that by mixing cork granulate and polyethylene granulate with similar particle sizes, a heterogeneous solid mixture is obtained which upon feeding into a press at temperatures in the range of 160° C. to 200° C. for a period of time between 24 and 180 seconds, followed by a cooling period for a period of time between 32 and 240 seconds, allows for a homogeneous composite panel with a uniform distribution of raw materials, without complete melting of the polyethylene and thus overcoming the drawbacks of the prior art.

The composite has excellent physicochemical and mechanical properties and has high intrinsic resistance, suitable to its application. Moreover, the panels obtained by the process of the present invention have a low density compared to prior art panels, since the cork is not compressed as after extrusion.

Thus, the process of the invention proves to be an excellent improvement over the processes known and used in the art, for their simplicity of execution, because there is no thermal/mechanical degradation of the cork and quality of the final product, due to the maintenance of cork density.

Next, the process for preparation of polyethylene-cork composite panels is described in detail.

The process of the present invention comprises the steps of:
a) mixing 10-64% of cork granulate and 36-90% of polyethylene granulate at room temperature, and feeding a press with this mixture;
b) compressing the mixture of step a) in the press with a compression force in the range of 300-450 kN, at a temperature in the range of 160–200° C. and for a hot compression time between 24-180 seconds;
c) cooling to room temperature, with a compression force between 350-450 kN, for a cold compression time between 32-240 seconds;
to obtain panels with a thickness between 3 and 5 mm, provided that:
for a thickness of 3 mm and temperature of step b) of 160° C., the minimum value of the hot compression time is 180 seconds; and
for a thickness of 3 mm when the mixture has 60% or more of cork, the temperature value of step b) is 200° C.

Preferably in the mixture of step a), the cork granulate has a particle size in the range of 0.5-1.0 mm and the polyethylene granulate has a particle size in the range of 0.3-1.0 mm.

In one embodiment of the invention, in the mixture of step a), paraffin is further added. The paraffin is liquid at room temperature, stable and resistant to chemical changes at the temperature ranges in which the process of the invention occurs and has thermoplastic properties, whereby it functions as a binding agent and promotes the composite homogeneity. The use of paraffin is preferred when the particle size of polyethylene and cork are different.

In another embodiment of the present invention, the mixture may further incorporate a filler, as another additional component.

In another embodiment, the polyethylene granulate may undergo a pre-treatment with the introduction of a filler which provides it improved stability.

The filler, whether incorporated in the mixture as one of its ingredients or pre-incorporated in the polyethylene granulate, is selected from the group comprising calcium carbonate, but it may be talc, magnesium hydroxide, kaolin, natural and synthetic fibres, among others, and mixtures thereof. Preferably, the filler is calcium carbonate ($CaCO_3$).

The percentage of filler present in the polyethylene granulate is about 10 to 34% of the total mixture of step a), preferably 30% of the total mixture.

Furthermore, it has been found that the use of a polyethylene granulate with an incorporated filler, without addition of paraffin, provides composite panels with an improved stability.

Also in step a), the mixture is fed into the press. In this step, an adjustable spatula or doctor blade may be used which limits the quantity of the feeded mixture to obtain panels having the thickness between 2 and 5 mm and density between 800 and 900 $kg/m^3$.

In step b), the mixture is compressed in the press with a pressure in the range of 300-450 kN, preferably 350-400 kN. Compression occurs at a temperature in the range of 160° C. to 200° C., preferably 170° C. to 200° C. The compression time is comprised between 24 and 180 seconds, preferably between 72 and 180 seconds.

In step c), the mixture is allowed to cool down in the press at a pressure of 350-450 kN, preferably 400-450 kN, for a period of time between 32 and 240 seconds, obtaining panels with thickness between 2 and 5 mm.

The present invention also relates to polyethylene-cork composite panels having a high dimensional stability, thickness comprised between 3 and 5 mm, density between 800-900 $kg/m^3$, tensile strength (EN 319) higher than 1.3 MPa, water absorption of less than 3% and hardness between 45 and 65 Shore D, and its use as cover board core.

EXAMPLES

Next, the results of the tests performed on composite panels obtained by the process of the present invention, as well as the description thereof, are shown.

Mechanical Tests

In order to perform the mechanical tests, it is necessary to cut test pieces, the number of which depends on the test, and with a size appropriate to the subject test. Table 1 lists the quantities of test pieces required and their dimensions according to the test.

TABLE 1

Number of test pieces and their dimensions (width and length), for each test.

| Test | No. of test pieces | Test piece dimensions, mm |
|---|---|---|
| Ultimate tensile strength, radial section | 5 | 50.8 × 50.8 |
| Water absorption | 3 | 25.4 × 76.2 |
| Density | depends on material thickness | 50.8 × 101.6 |

Ultimate Tensile Strength Test

Of all the tests, the ultimate tensile strength test is the most important since it studies the strength of the material when subjected to transverse or radial forces so as to elongate until breakage. For this, a tensometer is used.

Given the purpose of the composite, it is not relevant to measure the ultimate tensile strength at cross-section. In this way, the ultimate tensile strength was measured in a more suitable way to the product, which applies a force in the radial section of the test piece, in order to determine the binding force between the components (binding between the cork and the thermoplastic).

This test is termed flat-tensile strength (FTS) according to EN 319. For this test it is necessary to weigh and measure the thickness of the test pieces at three points in order to calculate an average thickness. The width and length are also measured for the area calculation, as this influences the value of the strength. The test pieces are then glued, with an appropriate adhesive, to the metal parts of the equipment.

This test uses an appropriate software that indicates the peak strength as well as the elongation, and the value of the area and the average thickness of each of the test pieces are inserted at the beginning of the test.

Water Absorption

The water absorption test aims to evaluate the behaviour of the material when subjected to possible disturbances, determining variations in weight and thickness.

Thus, the test pieces are pre-weighed, the thicknesses are measured at three points on the test piece and its average thickness is determined. At the end of the tests, the test pieces are again weighed and the thickness is measured again at the initial points, once again obtaining a final average thickness. The weight and thickness variations of each test piece are calculated, respectively, by Equation 4 and Equation 5.

$$\Delta P(\%) = \frac{P_f - P_i}{P_i} \cdot 100 \tag{4}$$

$$\Delta e(\%) = \frac{e_f - e_i}{e_i} \cdot 100 \tag{5}$$

wherein, $P_i$ is the initial weight of the test piece (g), $P_f$ the final weight of the test piece (g), $e_i$ the initial average thickness (mm) and $e_f$ the final average thickness (mm).

The water absorption test was run according to applicant's internal methods, based on the VDA 675 301 guideline.

In this test, the test pieces are placed in a water container so they are fully immersed for 24 hours. At the end of this time, the test pieces are dried and the weighing and thickness measurement are again made at the initial points. Once these measurements have been made, they are placed on the laboratory bench, exposed to the lab conditions, for a period of 24 hours. After this time, a new weighing and a new thickness measurement are carried out in the respective points. The calculations of the weight and thickness variation are made by the same equations of the previous tests, Equation 4 and Equation 5, respectively.

Determination of the Hardness

Hardness is a parameter that measures the deformation strength of a solid material, related to the binding force of the atoms. For different materials, different scales are used, and the shore scale is suitable for polymers. For the subject material, the appropriate scale is shore D.

This test measures the penetration of a specific indenter when forced into the material under specific conditions. The hardness of the material depends on the modulus of elasticity and viscoelastic behaviour thereof.

A durometer was used to perform this test. Determination of the hardness is made for a minimum thickness of 6 mm. Since the agglomerated panels have a thickness of less than 6 mm, it was necessary to use an extra teste piece, so that when overlapped they had a thickness of more than 6 mm.

Determination of the Density

Density is a very important property, given its influence on mechanical properties. The density test was carried out according to ASTM F 1315.

The density is a measurement of the ratio of mass to volume and is therefore easily determined by measuring the mass of the teste piece on an analytical weighing scale and by a thickness gauge.

The calculation of the density is obtained by:

$$\rho\left(\frac{g}{cm^2}\right) = \frac{W \cdot 10}{T \cdot A} \tag{6}$$

Wherein, W is the weight of the test piece, in grams, T is the average thickness, in mm, and A is the area of the test piece, in $cm^2$.

The average thickness is calculated taking into account the measurement made in five points of the test piece.

In the preparation of the panels to be tested, the amount of material per $m^2$ to be fed into the press is directly dependant on the desired density and final thickness.

For example, if a material of 900 kg/$m^3$ of density and 5 mm of thickness is desired, 4.5 kg is required, i.e., 1 $m^2$×0.005 m×900 kg/$m^3$=4.5 kg

| | | Minimum and maximum temperature limit (cont.) | | | |
|---|---|---|---|---|---|
| Test | Formulation | operation conditions | FTS (MPa) | Hardness (shore D) | Water Abs. (%) |
| 1 | 1% paraffin 62% PE 37% cork | T = 160° C. t.h. = 72 s t.c. = 96 s th = 5 mm | | DNW | |
| 2 | 1% paraffin 62% PE 37% cork | T = 160° C. t.h. = 103 s t.c. = 140 s th = 5 mm | | DNW | |
| 3 | 1% paraffin 62% PE 37% cork | T = 160° C. t.h. = 103 s t.c. = 140 s th = 3 mm | | DNW | |
| 4 | 1% paraffin 62% PE 37% cork | T = 160° C. t.h. = 180 s t.c. = 240 s th = 3 mm | >1.3 | 45-65 | 24 h = <3% 24 h + 24 h @ RT = <1% |
| 5 | 1% paraffin 62% PE 37% cork | T = 160° C. t.h. = 180 s t.c. = 240 s th = 5 mm | | DNW | |
| 6 | 4% paraffin 35% PE 61% cork | T = 160° C. t.h. = 180 s t.c. = 240 s th = 5 mm | | DNW | |
| 7 | 4% paraffin 35% PE 61% cork | T = 180° C. t.h. = 180 s t.c. = 240 s th = 5 mm | | DNW | |
| 8 | 4% paraffin 35% PE 61% cork | T = 180° C. t.h. = 180 s t.c. = 240 s th = 3 mm | | DNW | |

Minimum and maximum temperature limit (cont.)

| Test | Formulation | operation conditions | FTS (MPa) | Hardness (shore D) | Water Abs. (%) |
|---|---|---|---|---|---|
| 9 | 4% paraffin 46% PE 50% cork | T = 160° C. t.h. = 180 s t.c. = 240 s th = 3 mm | >1.3 | 45-65 | 24 h = <3% 24 h + 24 h @ RT = <1% |
| 10 | 4% paraffin 46% PE 50% cork | T = 160° C. t.h. = 180 s t.c. = 240 s th = 4 mm | | | DNW |
| 11 | 4% paraffin 46% PE 50% cork | T = 160° C. t.h. = 120 s t.c. = 160 s th = 3 mm | | | DNW |
| 12 | 4% paraffin 56% PE 40% cork | T = 170° C. t.h. = 180 s t.c. = 240 s th = 5 mm | | | DNW |
| 13 | 4% paraffin 56% PE 40% cork | T = 170° C. t.h. = 180 s t.c. = 240 s th = 3 mm | >1.3 | 45-65 | 24 h = <3% 24 h + 24 h @ RT = <1% |
| 14 | 4% paraffin 56% PE 40% cork | T = 170° C. t.h. = 180 s t.c. = 240 s th = 4 mm | | | DNW |
| 15 | 4% paraffin 56% PE 40% cork | T = 170° C. t.h. = 120 s t.c. = 160 s th = 3 mm | | | DNW |
| 16 | 4% paraffin 56% PE 40% cork | T = 160° C. t.h. = 180 s t.c. = 240 s th = 3 mm | | | DNW |
| 17 | 4% paraffin 56% PE 40% cork | T = 170° C. t.h. = 144 s t.c. = 192 s th = 3 mm | >1.3 | 45-65 | 24 h = <3% 24 h + 24 h @ RT = <1% |
| 18 | 1% paraffin 62% PE 37% cork | T = 180° C. t.h. = 180 s t.c. = 240 s th = 5 mm | >1.3 | 45-65 | 24 h = <3% 24 h + 24 h @ RT = <1% |
| 19 | 20% paraffin 49.9% PE 29.1% cork | T = 180° C. t.h. = 180 s t.c. = 240 s th = 5 mm | >1.3 | 45-65 | 24 h = <3% 24 h + 24 h @ RT = <1% |
| 20 | 63% PE 37% cork | T = 190° C. t.h. = 90 s t.c. = 120 s th = 3 mm | | | DNW |
| 21 | 63% PE 37% cork | T = 200° C. t.h. = 120 s t.c. = 160 s th = 3 mm | >1.3 | 45-65 | 24 h = <3% 24 h + 24 h @ RT = <1% |
| 22 | 63% PE 37% cork | T = 200° C. t.h. = 120 s t.c. = 160 s th = 5 mm | >1.3 | 45-65 | 24 h = <3% 24 h + 24 h @ RT = <1% |
| 23 | 4% paraffin 36% PE 60% cork | T = 200° C. t.h. = 120 s t.c. = 160 s th = 3 mm | >1.3 | 45-65 | 24 h = <3% 24 h + 24 h @ RT = <1% |
| 24 | 4% paraffin 36% PE 60% cork | T = 200° C. t.h. = 120 s t.c. = 160 s th = 5 mm | | | DNW |
| 29 | 20% paraffin 49.9% PE 29.1% cork | T = 200° C. t.h. = 120 s t.c. = 160 s th = 5 mm | >1.3 | 45-65 | 24 h = <3% 24 h + 24 h @ RT = <1% |

DNW—did not work;
T—temperature;
RT—room temperature;
t.h.—hot compression time;
t.c.—cold compression time;
th—thickness

Variation of paraffin percentage (keeping cork-PE ratio)

| Test | Formulation | operation conditions | FTS (MPa) | Hardness (shore D) | Water Abs. (%) |
|---|---|---|---|---|---|
| 1 | 1% paraffin 62% PE 37% cork | T = 160° C. t.h. = 72 s t.c. = 96 s th = 5 mm | | | DNW |
| 2 | 1% paraffin 62% PE 37% cork | T = 160° C. t.h. = 103 s t.c. = 140 s th = 5 mm | | | DNW |
| 3 | 1% paraffin 62% PE 37% cork | T = 160° C. t.h. = 103 s t.c. = 140 s th = 3 mm | | | DNW |
| 4 | 1% paraffin 62% PE 37% cork | T = 160° C. t.h. = 180 s t.c. = 240 s th = 3 mm | >1.3 | 45-65 | 24 h = <3% 24 h + 24 h @ RT = <1% |
| 5 | 1% paraffin 62% PE 37% cork | T = 160° C. t.h. = 180 s t.c. = 240 s th = 5 mm | | | DNW |
| 18 | 1% paraffin 62% PE 37% cork | T = 180° C. t.h. = 180 s t.c. = 240 s th = 5 mm | >1.3 | 45-65 | 24 h = <3% 24 h + 24 h @ RT = <1% |
| 19 | 20% paraffin 49.9% PE 29.1% cork | T = 180° C. t.h. = 180 s t.c. = 240 s th = 5 mm | >1.3 | 45-65 | 24 h = <3% 24 h + 24 h @ RT = <1% |
| 20 | 63% PE 37% cork | T = 190° C. t.h. = 90 s t.c. = 120 s th = 3 mm | | | DNW |
| 21 | 63% PE 37% cork | T = 200° C. t.h. = 120 s t.c. = 160 s th = 3 mm | >1.3 | 45-65 | 24 h = <3% 24 h + 24 h @ RT = <1% |
| 22 | 63% PE 37% cork | T = 200° C. t.h. = 120 s t.c. = 160 s th = 5 mm | >1.3 | 45-65 | 24 h = <3% 24 h + 24 h @ RT = <1% |
| 29 | 20% paraffin 49.9% PE 29.1% cork | T = 200° C. t.h. = 120 s t.c. = 160 s th = 5 mm | >1.3 | 45-65 | 24 h = <3% 24 h + 24 h @ RT = <1% |
| 36 | 0% paraffin 63% PE 37% cork | T = 180° C. t.h. = 72 s t.c. = 96 s th = 5 mm | >1.3 | 45-65 | 24 h = <3% 24 h + 24 h @ RT = <1% |

DNW—did not work;
T—temperature;
RT—room temperature;
t.h.—hot compression time;
t.c.—cold compression time;
th—thickness

| Variation of cork percentage (keeping paraffin percentage and adjusting PE percentage) | | | | |
|---|---|---|---|---|
| Test | Formulation | operation conditions | FTS (MPa) | Hardness (shore D) | Water Abs. (%) |
| 6 | 4% paraffin 35% PE 61% cork | T = 160° C. t.h. = 180 s t.c. = 240 s th = 5 mm | | | DNW |
| 7 | 4% paraffin 35% PE 61% cork | T = 180° C. t.h. = 180 s t.c. = 240 s th = 5 mm | | | DNW |
| 8 | 4% paraffin 35% PE 61% cork | T = 180° C. t.h. = 180 s t.c. = 240 s th = 3 mm | | | DNW |
| 9 | 4% paraffin 46% PE 50% cork | T = 160° C. t.h. = 180 s t.c. = 240 s th = 3 mm | >1.3 | 45-65 | 24 h = <3% 24 h + 24 h @ RT = <1% |
| 10 | 4% paraffin 46% PE 50% cork | T = 160° C. t.h. = 180 s t.c. = 240 s th = 4 mm | | | DNW |
| 11 | 4% paraffin 46% PE 50% cork | T = 160° C. t.h. = 120 s t.c. = 160 s th = 3 mm | | | DNW |
| 12 | 4% paraffin 56% PE 40% cork | T = 170° C. t.h. = 180 s t.c. = 240 s th = 5 mm | | | DNW |
| 13 | 4% paraffin 56% PE 40% cork | T = 170° C. t.h. = 180 s t.c. = 240 s th = 3 mm | >1.3 | 45-65 | 24 h = <3% 24 h + 24 h @ RT = <1% |
| 14 | 4% paraffin 56% PE 40% cork | T = 170° C. t.h. = 180 s t.c. = 240 s th = 4 mm | | | DNW |
| 15 | 4% paraffin 56% PE 40% cork | T = 170° C. t.h. = 120 s t.c. = 160 s th = 3 mm | | | DNW |
| 16 | 4% paraffin 56% PE 40% cork | T = 160° C. t.h. = 180 s t.c. = 240 s th = 3 mm | | | DNW |
| 17 | 4% paraffin 56% PE 40% cork | T = 170° C. t.h. = 144 s t.c. = 192 s th = 3 mm | >1.3 | 45-65 | 24 h = <3% 24 h + 24 h @ RT = <1% |
| 23 | 4% paraffin 36% PE 60% cork | T = 200° C. t.h. = 120 s t.c. = 160 s th = 3 mm | >1.3 | 45-65 | 24 h = <3% 24 h + 24 h @ RT = <1% |
| 24 | 4% paraffin 36% PE 60% cork | T = 200° C. t.h. = 120 s t.c. = 160 s th = 5 mm | | | DNW |

DNW—did not work;
T—temperature;
RT—room temperature;
t.h.—hot compression time;
t.c.—cold compression time;
th—thickness

| Type of cork used (variation of density and particle size) | | | | | |
|---|---|---|---|---|---|
| Test | Formulation | operation conditions | FTS (MPa) | Hardness (shore D) | Water Abs. (%) |
| 25 | 35% low density cork 0.5-1 mm 4% paraffin 61% PE | T = 180° C. t.h. = 180 s t.c. = 240 s th = 3 mm | | | DNW |
| 26 | 35% low density cork 0.5-1 mm 4% paraffin 61% PE | T = 200° C. t.h. = 180 s t.c. = 240 s th = 5 mm | | | DNW |
| 27 | 35% high density cork 1-2 mm 4% paraffin 61% PE | T = 180° C. t.h. = 120 s t.c. = 160 s th = 5 mm | >1.3 | 45-65 | 24 h = <3% 24 h + 24 h @ RT = <1% |
| 30 | 100% PE | T = 160° C. t.h. = 120 s t.c. = 160 s th = 5 mm | | | DNW |
| 31 | 100% PE | T = 180° C. t.h. = 120 s t.c. = 160 s th = 5 mm | >1.3 | 45-65 | 24 h = <3% 24 h + 24 h @ RT = <1% |
| 32 | 35% Cork with 0.2-0.6 mm 4% paraffin 61% PE | T = 180° C. t.h. = 180 s t.c. = 240 s th = 5 mm | >1.3 | 45-65 | 24 h = <3% 24 h + 24 h @ RT = <1% |

DNW—did not work;
T—temperature;
RT—room temperature;
t.h.—hot compression time;
t.c.—cold compression time;
th—thickness

| Density of final panel | | | | | |
|---|---|---|---|---|---|
| Test | Formulation | operation conditions | FTS (MPa) | Hardness (shore D) | Water Abs. (%) |
| 34 | 4% paraffin 35% cork 61% PE Formulation with 600 kg/m³ | T = 180° C. t.h. = 120 s t.c. = 160 s th = 5 mm | >1.3 | 45-65 | 24 h = <3% 24 h + 24 h @ RT = <1% |
| 35 | 4% paraffin 35% cork 61% PE Formulation with 1100 kg/m³ | T = 180° C. t.h. = 120 s t.c. = 160 s th = 5 mm | >1.3 | 45-65 | 24 h = <3% 24 h + 24 h @ RT = <1% |

DNW—did not work;
T—temperature;
RT—room temperature;
t.h.—hot compression time;
t.c.—cold compression time;
th—thickness

| Variation of filler percentage in polyethylene granulate | | | | | |
|---|---|---|---|---|---|
| Test | Formulation | operation conditions | FTS (MPa) | Hardness (shore D) | Water Abs. (%) |
| 40 | 25% cork 43% PE 32% CaCO₃ | T = 190° C. t.h. = 120 s t.c. = 160 s th = 5 mm | >1.3 | 45-65 | 24 h = <3% 24 h + 24 h @ RT = <1% |
| 41 | 30% cork 50% PE | T = 190° C. t.h. = 90 s | >1.3 | 45-65 | 24 h = <3% 24 h + 24 h @ |

-continued

Variation of filler percentage in polyethylene granulate

| Test | Formulation | operation conditions | FTS (MPa) | Hardness (shore D) | Water Abs. (%) |
|------|-------------|---------------------|-----------|--------------------|----------------|
|      | 20% CaCO$_3$ | t.c. = 120 s<br>th = 5 mm |  |  | RT = <1% |

DNW—did not work;
T—temperature;
RT—room temperature;
t.h.—hot compression time;
t.c.—cold compression time;
th—thickness Variation of filler percentage in the mixture

| Test | Formulation | operation conditions | FTS (MPa) | Hardness (shore D) | Water Abs. (%) |
|------|-------------|---------------------|-----------|--------------------|----------------|
| 45 | 31.5% cork<br>54.9% PE<br>3.6% paraffin<br>10% CaCO$_3$ | T = 190° C.<br>t.h. = 90 s<br>t.c. = 120 s<br>th = 5 mm | >1.3 | 45-65 | 24 h = <3%<br>24 h +<br>24 h @<br>RT = <1% |
| 46 | 28% cork<br>49% PE<br>3% paraffin<br>20% CaCO$_3$ | T = 190° C.<br>t.h. = 180 s<br>t.c. = 240 s<br>th = 5 mm | >1.3 | 45-65 | 24 h = <3%<br>24 h +<br>24 h @<br>RT = <1% |

DNW—did not work;
T—temperature;
RT—room temperature;
t.h.—hot compression time;
t.c.—cold compression time;
th—thickness The panels of the present invention thus show advantages over prior art panels namely:
  low density of the cork panel with thermoplastic (when compared to material obtained by extrusion or pultrusion)
  machining ability (when compared to cork)
  intrinsic resistance suitable to the application
  physico-mechanical properties suitable for use as cover board core The process of the present invention has enormous advantages when compared with prior art technologies, namely:
  no thermal/mechanical degradation of cork, by avoiding extrusion/pultrusion processes;
  the process steps are simple and do not include prior steps to simultaneously granulate, in the same granule, the cork and the polymer;
  enables a high throughput, from one to several m$^2$/minute;
  easily adaptable to the production of large panels.

The invention claimed is:

1. A process for preparation of polyethylene-cork composite panels comprising the steps of:
  a) mixing 10-64% by weight of cork granulate and 36-90% by weight of polyethylene granulate at room temperature, and feeding a press with this mixture;
  b) compressing the mixture of step a) in the press with a compression force in the range of 300-450 kN, at a temperature in the range of 160-200° C. and for a hot compression time between 24-180 seconds;
  c) cooling to room temperature, with a compression force between 350-450 kN, for a cold compression time between 32 and 240 seconds;
  to obtain panels with a thickness between 3 and 5 mm.

2. The process for preparation of polyethylene-cork composite panels according to claim 1, wherein step a) further comprises adding up to 20% by weight of paraffin.

3. The process for preparation of polyethylene-cork composite panels according to claim 2, wherein step a) further comprises adding 10 to 34% of a filler by weight, the filler comprising at least one of calcium carbonate, talc, magnesium hydroxide, kaolin, natural and synthetic fibres.

4. The process for preparation of polyethylene-cork composite panels according to claim 1, wherein the polyethylene granulate of step a) comprises 20 to 32% of a filler by weight, the filler comprising at least one of calcium carbonate, talc, magnesium hydroxide, kaolin, natural and synthetic fibres, and mixtures thereof.

5. The process for preparation of polyethylene-cork composite panels according to claim 4, wherein the filler is calcium carbonate.

6. The process according to claim 1, wherein the mixing is carried out with the cork granulate having a particle size in the range of 0.5-1 mm.

7. The process according to claim 1, wherein the mixing is carried out with polyethylene granulate having a particle size in the range of 0.3-1 mm.

8. The process for preparation of polyethylene-cork composite panels according to claim 1, wherein to obtain a panel having a thickness of 5 mm:
  in step a) 37% by weight of cork granulate and 63% by weight of polyethylene granulate are mixed;
  in step b) the temperature is 180° C. and the hot compression time is 72 seconds;
  in step c) the cold compression time is 96 seconds.

9. The process for preparation of polyethylene-cork composite panels according to claim 2, wherein to obtain a panel having a thickness of 3 mm:
  in step a) 50% by weight of cork granulate, 63% by weight of polyethylene granulate and 4% by weight of paraffin are mixed;
  in step b) the temperature is 160° C. and the hot compression time is 180 seconds;
  in step c) the cold compression time is 240 seconds.

10. The process for preparation of polyethylene-cork composite panels according to claim 3, wherein to obtain a panel having a thickness of 5 mm:
  in step a) 31.5% by weight of cork granulate, 54.9% by weight of polyethylene granulate, 3.6% by weight of paraffin and 10% by weight of calcium carbonate are mixed;
  in step b) the temperature is 190° C. and the hot compression time is 90 seconds;
  in step c) the cold compression time is 120 seconds.

11. The process for preparation of polyethylene-cork composite panels according to claim 4, wherein to obtain a panel having a thickness of 5 mm:
  in step a) 25% by weight of cork granulate, 43% by weight of polyethylene granulate with 32% by weight of incorporated calcium carbonate are mixed;
  in step b) the temperature is 190° C. and the hot compression time is 120 seconds;
  in step c) the cold compression time is 160 seconds.

12. The process for preparation of polyethylene-cork composite panels according to claim 1, wherein:
  to obtain a panel having a thickness of 3 mm and when the temperature of step b) is 160° C., the hot compression time is 180 seconds.

13. The process for preparation of polyethylene-cork composite panels according to claim 1, wherein:

to obtain a panel having a thickness of 3 mm when the mixture has 60% or more by weight of the cork granulate, the temperature value of step b) is 200° C.

\* \* \* \* \*